United States Patent Office 3,243,863
Patented Apr. 5, 1966

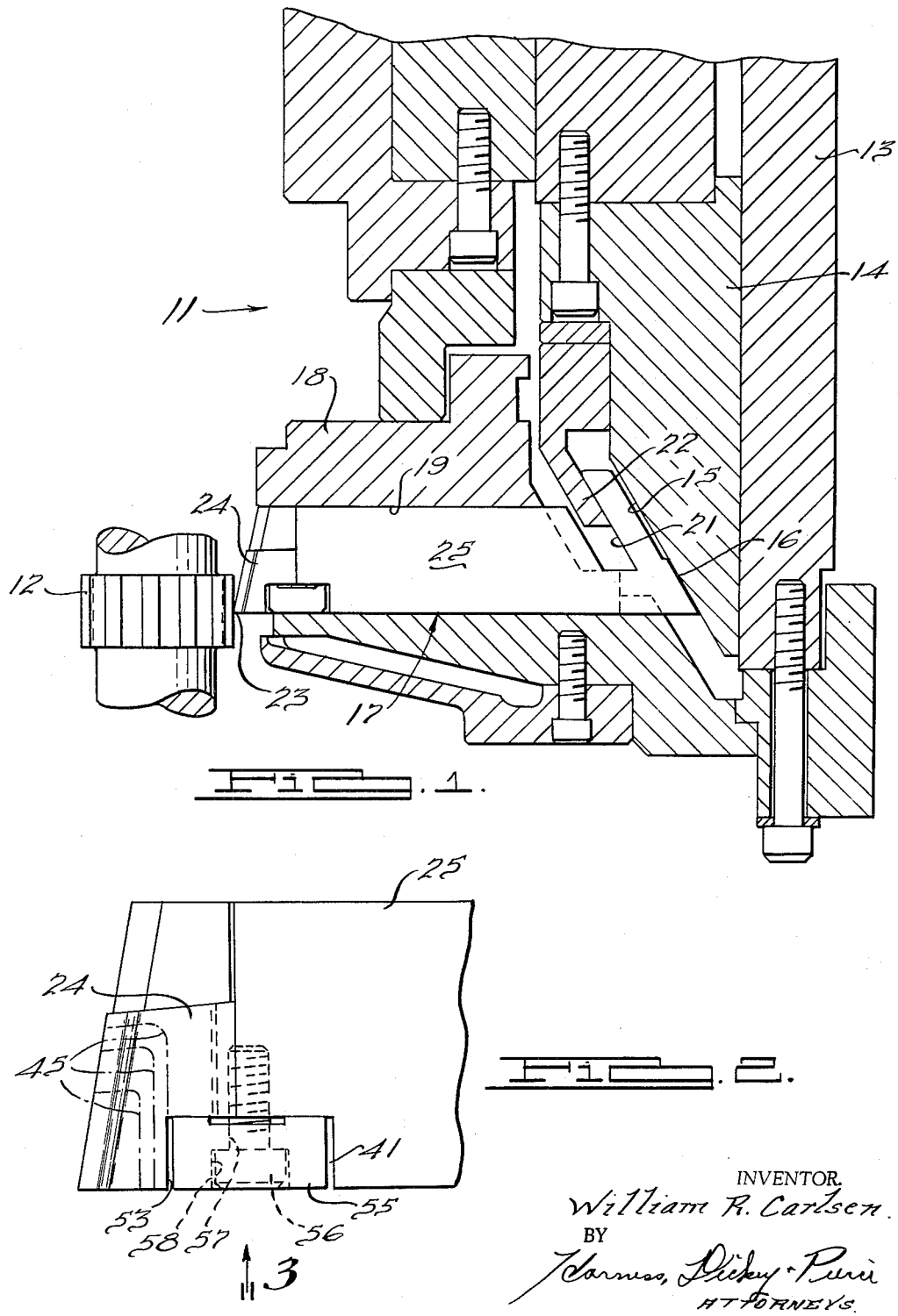

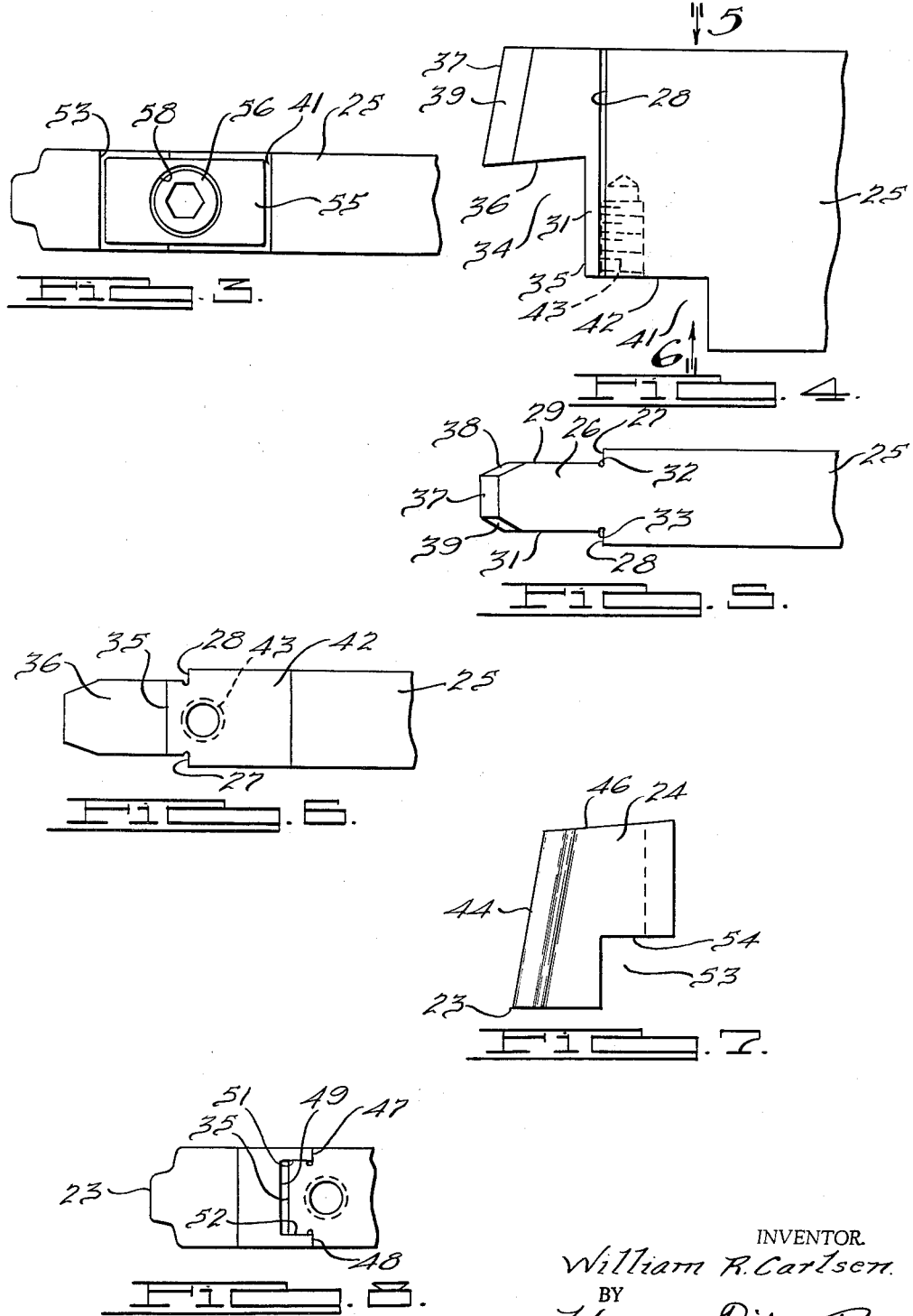

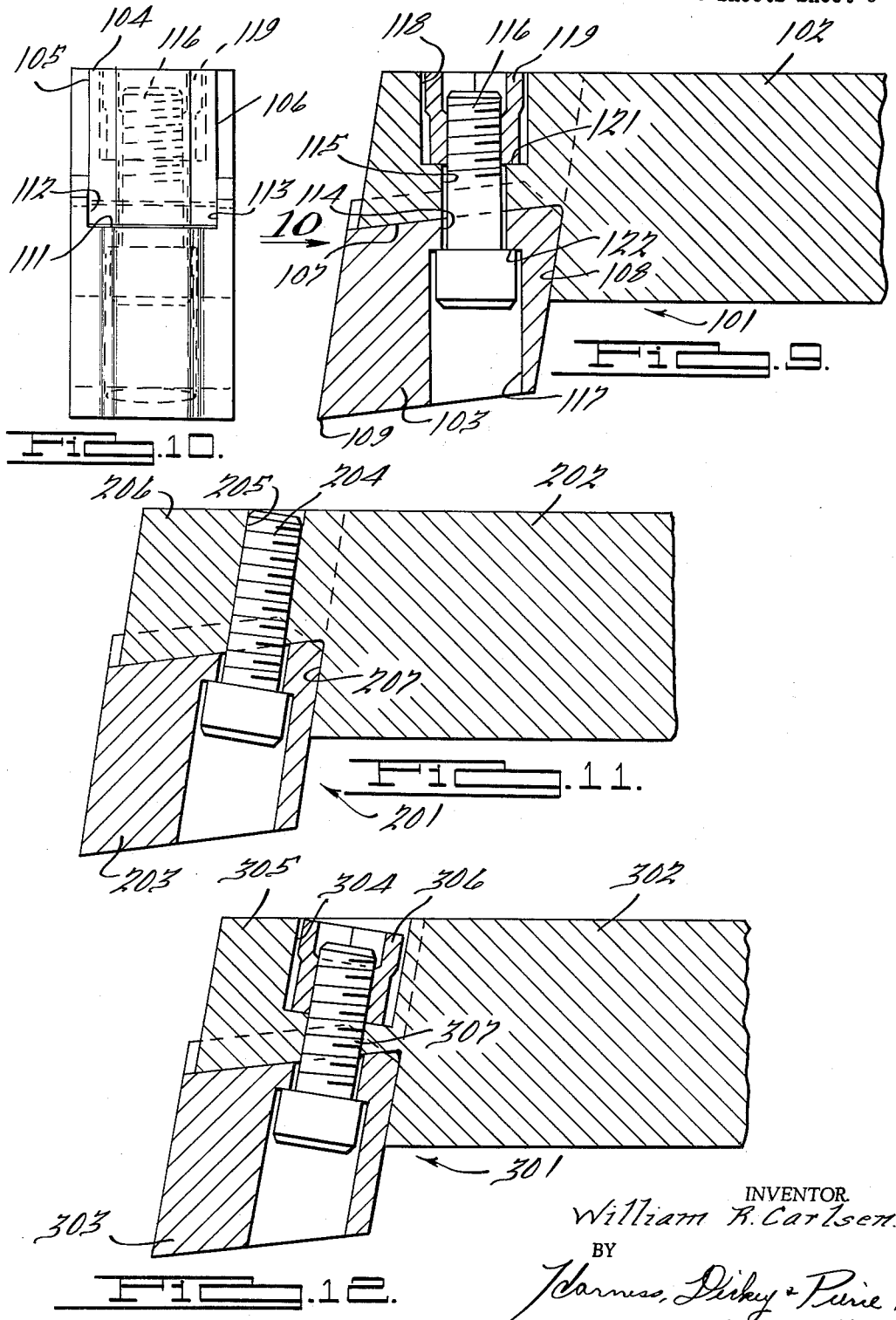

3,243,863
CUTTING TOOL
William R. Carlsen, Huntington Woods, Mich., assignor to Michigan Tool Company, Detroit, Mich., a corporation of Delaware
Filed Dec. 27, 1963, Ser. No. 333,831
3 Claims. (Cl. 29—96)

This invention relates to cutting tools, and more particularly to tools used in gear shaping operations.

It is an object of the present invention to provide a novel and improved cutting tool construction useful in gear tooth shaping machines of the type shown in Patent No. 2,346,877 dated April 18, 1944, but which is of greatly decreased cost and in which the tip may be sharpened while still using the main body of the cutting tool in the machine with another tip.

It is a further object to provide an improved cutting tool construction of this nature in which the cutting tip is accurately located at all times, with the cutting forces on the tool being transmitted to the main tool body in such a manner as to maintain the cutting tip in position.

Other objects, features, and advantages of the present invention will become apparent from the subsequent description, taken in conjunction with the accompanying drawings.

In the drawings:

FIGURE 1 is a partially schematic cross-sectional view in elevation of a portion of a gear shaping machine with a suitable form of the cutting tool of this invention mounted therein;

FIGURE 2 is an enlarged fragmentary side elevational view of the forward portion of the cutting tool;

FIGURE 3 is a bottom plan view thereof looking in the direction of the arrow 3 of FIGURE 2;

FIGURE 4 is a side elevational view of the forward portion of the retaining section of the tool;

FIGURE 5 is top plan view of the retaining section taken in the direction of the arrow 5 of FIGURE 4;

FIGURE 6 is a bottom plan view of the retaining section taken in the direction of the arrow 6 of FIGURE 4;

FIGURE 7 is a side elevational view of the cutting section of the tool;

FIGURE 8 is a view similar to FIGURE 3 but with the clamp removed;

FIGURE 9 is a cross-sectional view in elevation of the forward portion of a modified form of the cutting tool in which the cutting section is secured to the retaining section by a bolt and nut;

FIGURE 10 is an end elevational view of the embodiment of FIGURE 9 taken in the direction of the arrow 10 thereof;

FIGURE 11 is a view similar to FIGURE 9 of a still further modification of the invention in which the securing bolt is threadably connected directly to the retaining section and extends parallel a locating surface on the retaining section; and FIGURE 12 is a view similar to FIGURES 9 and 10 of yet another embodiment of the invention which is similar to that of FIGURE 10 but utilizes a nut instead of a threaded retaining section aperture.

In general terms, each of the illustrated embodiments of the invention comprises a flat elongated cutting tool adapted to be mounted in a slotted head for a gear shaping machine such as is shown in the above-mentioned patent. The tool is made up of two sections, a retaining section which is adapted to coact with feed cones in the machine retainer housing, and a cutting section which carries the cutting edge and is removably secured to the retaining section. The connection between the two tool sections is such that the cutting section is accurately located in both longitudinal and lateral directions with respect to the retaining section, the latter being guided in the slotted head, whereby the cutting section will accurately machine the workpiece and form properly spaced and shaped teeth. The locating means includes a slot on the cutting section having parallel sides, which sides coact with parallel surfaces of a portion of reduced thickness on the forward end of the retaining section. The forward end also has a recess to accommodate the cutting section, the recess having two angularly related edge surfaces which support the cutting section, at least one edge surface being inclined in such a manner that the cutting forces will tend to hold the cutting section in position.

In one embodiment of the invention the cutting section is secured in position by a bridge-like clamping member disposed in contiguous recesses in the retaining and cutting sections, the clamping member being secured in position by a bolt threadably mounted in the retaining section. In other embodiments of the invention, a bolt, or a bolt and nut, are used to secure the cutting section in place, the bolt head being disposed in a counterbored hole in the cutting section and secured to the retaining section by a nut or a direct threaded connection. The bolt in these embodiments may extend at right angles to the extent of the retaining section or parallel to an inclined supporting edge surface on the retaining section for the cutting section.

In all cases, the retaining section may be fabricated of a relatively inexpensive tool steel, and the cutting section of more expensive material such as high speed steel or tungsten carbide. The locating and supporting surfaces on the retaining section will accurately locate the cutting section in both longitudinal and lateral directions, and the cutting section may be removed for sharpening while the retaining section is used with another cutting section.

Referring more particularly to the drawings, FIGURE 1 illustrates a portion of a gear shaving machine generally indicated at 11, which is like that shown in the aforementioned patent and is used for simultaneously shaping the interstices between all the teeth on a gear workpiece 12. A retainer housing 13 slidably supports a feed cone 14 for vertical movement, cone 14 having a surface 15 for coaction with the inclined surfaces 16 of a plurality of circumferentially spaced cutting tools, each tool being generally indicated at 17.

Tools 17 are radially arranged in a slotted head or tool guide 18, the guide having slots 19 within which the tools are slidably supported. The outer ends of the tools have recessed portions with inclined surfaces 21, these surfaces being cooperable with an inner cone 22 secured to outer cone 14. The inner or forward ends of the cutting tools have cutting edges 23 facing the lower narrow tool edges and simultaneously engageable with the workpiece 12.

In operation of the apparatus thus far described, workpiece 12 will be continually reciprocated in a vertical direction. During each upstroke, tool 17 will be so positioned as to cause cutting edges 23 to shave material from the interstices between the workpiece teeth to be formed. After each upstroke, cone 14 will be moved upwardly, causing cutting tools 17 to be retracted, the cutting tool shown in FIGURE 1 being retracted to the right, so that the workpiece downstroke may be effected without contact between the tools and workpiece. After each downstroke of the workpiece, cone 14 will be fed downwardly, shifting tools 17 radially inwardly in preparation for the next cutting stroke or upstroke of workpiece 12.

The construction of each cutting tool 17 is seen in detail in FIGURES 2 to 8. Each cutting tool comprises a cutting section 24 and a retaining section 25. The two sections are of flat shape and their main portions of equal thickness, as seen in FIGURES 3 and 8.

The construction of the inner or forward end of retaining section is best seen in FIGURES 4, 5 and 6. The main body of retaining section 25 has a height of approximately equal to that of slot 19 so that the upper and lower surfaces of the slot will slidably support the retaining section. The forward portion 26 of the retaining section is of reduced thickness, a pair of shoulders 27 and 28 being formed at the juncture of portion 26 with the main body of section 25, these shoulders extending at right angles to the longitudinal extent of the retaining section and being in a common plane. The junctures of shoulders 27 and 28 with side surfaces 29 and 31 respectively of portion 26 are relieved, as indicated at 32 and 33 in FIGURE 5.

A cutting tool receiving recess 34, indicated in FIGURE 4, is formed in portion 26 of the retaining section, this recess having a first wall 35 parallel to but spaced forwardly from shoulders 27 and 28, and a second wall 36 which extends from wall 35 in an inclined manner to the forward or inner end of portion 26 of the retaining section. The inclination of wall 36 is such that recess 34 is deeper at its outer or rearward end than at its forward end, so that upward forces in FIGURE 4 on a cutting section disposed within the recess will cause the cutting section to be forced firmly into the recess and against the walls 35 and 36. The forward surface 37 of forward portion 26 is inclined rearwardly in a direction away from recess 34, as indicated in FIGURES 4 and 5, this inclination being for clearance purpose as will hereinafter appear. Also for clearance reasons, chamfers 38 and 39 are formed on the sides of forward portion 26 of the retaining section extending rearwardly from forward surface 37, as seen in FIGURES 4 and 5.

A clamping member clearance recess 41 is also provided in the lower edge of section 25, this recess extending rearwardly from recess 34, as seen in FIGURE 4. Recess 41 has a clamp-engageable surface 42 extending parallel to the longitudinal extent of section 25, and a tapped hole 43 extends from surface 42 into section 25, as seen in FIGURES 4 and 6. The location of hole 43 is adjacent the forward end of surface 42 so as to accommodate a bolt passing through the central portion of the clamping member, as will hereinafter appear.

Cutting section 24 of tool 17 is best seen in FIGURES 7 and 8, and unlike retaining section 25, which may be fabricated of a relatively inexpensive tool steel, is of tungsten carbide or other desired material. Cutting edge 23 is formed at the lower end of the forward edge 44 of the cutting section 24, this edge being inclined upwardly and rearwardly as seen in FIGURE 7 at an angle similar to that of surface 37. The cross-sectional configuration of cutting edge 23 and of forward end 44 in planes perpendicular to the direction of workpiece movement is, as seen in FIGURE 8, complementary to the desired shape of the tooth interstices on workpiece 12, so that cutting member 24 may be sharpened by progressively reducing the size of forward edge 44, as seen by the dot-dash lines 45 in FIGURE 3.

A first bearing surface 46 is provided on cutting section 24 adapted to engage surface 36 of retaining section 25. and the cutting section is further provided with a pair of spaced surfaces 47 and 48 adapted to engage shoulders 27 and 28 respectively. Surfaces 47 and 48 are angularly related to surface 46 in such a manner that surfaces 36, 27 and 28 will be simultaneously engaged by the cutting section when in position, as seen in FIGURES 2 and 8. A slot 49 is provided between surfaces 47 and 48, this slot having side surfaces 51 and 52 engageable with the narrow portions of surfaces 29 and 31 respectively of retaining section 25 which run alongside recess 34. The depth of slot 49 is such that it will clear surface 35 of recess 34, as seen in FIGURE 8, so that surface 35 will not interfere with the accurate location of the cutting section by surfaces 36, 27 and 28 of retaining section 25. The extent of cutting section 24 in the direction of longitudinal extent of retaining section 25 is such that it projects slightly forwardly of section 25, as seen in FIGURE 2, so that section 25 will be clear of interference with the cutting action regardless of the extent of sharpening of cutting section 24.

The cutting section is also provided with a clamping member recess 53, as seen in FIGURE 7, this recess extending inwardly from the rearward lower corner of the cutting section and having a surface 54 contiguous with surface 42 of recess 41 when the cutting section is in position, as seen in FIGURE 2. The clamping means comprises a bridge-like clamping member 55 adapted to be disposed in contiguous recesses 41 and 53, as seen in FIGURE 2, member 55 having legs engageable with surfaces 42 and 54 respectively. Member 55 may be fabricated of metal having a certain amount of springiness, and a bolt 56 is threadable into aperture 43, the bolt passing through a clearance aperture 57 in the central portion of member 55, its head being received by a counterbore 58.

In operation, cutting section 24 may be placed in position by slipping slot 49 over surfaces 29 and 31, with surface 46 of the cutting section engaging surface 36 of the retaining section and surfaces 47 and 48 of the cutting section engaging shoulders 27 and 28 respectively. Clamping member 55 may then be placed in recesses 41 and 53 and bolt 56 tightened. It will be noted that because of the construction of the clamping means and particularly the springiness of clamping member 55, extreme accuracy is unnecessary in constructing the surfaces of the clamping member and the surfaces of the retaining and cutting sections engaged by the clamping member. Cutting section 24 will be located accurately in both longitudinal and lateral directions by the engaged retaining section surfaces 36, 27, 28, 29 and 31. The cutting forces exerted on the cutting section when in operation will be transmitted through surfaces 36, 27 and 28 to the retaining section. The inclined nature of supporting surface 36 will cause these cutting forces to wedge the cutting section even more firmly into recess 34, and longitudinal adjustment of retaining section 25 by cones 14 and 22 will result in the same adjustment for cutting section 24, the latter being held to the retaining section by the clamping member and the engagement of surfaces 36 and 46 to transmit any adjusting forces.

If it is desired to sharpen cutting section 24, this may be accomplished either without removing it from retaining section 25 or, if desired, by detaching it through removal of clamping member 55. If sharpened while detached, retaining member 25 could still be utilized with a replacement cutting section.

FIGURES 9 and 10 illustrate a modified form of the invention which is basically similar to the first embodiment but which utilizes a somewhat different clamping means. More particularly, the tool of FIGURES 9 and 10 is generally indicated at 101 and has a retaining section 102 and a cutting section 103. Retaining section 102 has a reduced forward portion 104, the sides of which form lateral locating surfaces 105 and 106 for cutting section 103, as seen in FIGURE 10. A recess is formed in the lower forward portion of retaining section 102, this recess having a first locating surface 107 and a second locating surface 108 for cutting section 103. Surface 107 is inclined upwardly and rearwardly from the horizontal, and surface 108 is inclined upwardly and rearwardly from the vertical, as seen in FIGURE 9, so that cutting section 103 will be wedged into the recess by the cutting forces on its cutting edge 109.

Cutting section 103 has a slot 111 with side surfaces 112 and 113 which are engageable with surfaces 105 and 106 respectively, adjacent surface 107, when the cutting section is in position, and with the slot base engaging surface 107. The cutting and retaining sections have clearance apertures 114 and 115 respectively, these apertures being contiguous when the cutting section is in position and being adapted to receive a clamping bolt 116. A counterbore 117 is provided in cutting section 103, and a nut receiving bore 118 is provided in the forward portion 104 of retaining section 102. With bolt 116 in position, a nut 119 may be threadably mounted thereon, the nut engaging a shoulder 121 at the inner end of bore 118. The head of bolt 116 will engage a shoulder 122, thereby drawing the cutting section into its retained position.

It will be noted that the embodiment of FIGURES 9 and 10 has the advantages of the previous embodiment with regard to the transmittal of cutting forces to the retaining section, the accuracy of lateral and longitudinal location of the cutting section, and its replaceability or removability for sharpening purposes.

FIGURE 11 shows another embodiment of the invention generally indicated at 201 which is generally similar to the previous embodiment, the retaining section being indicated at 202 and the cutting section at 203. This embodiment differs from the previous embodiment in that bolt 204 is secured directly to a tapped hole 205 in the forward portion 206 of section 202, the nut being eliminated. Furthermore, bolt 204 extends in a direction parallel to supporting surface 207 which corresponds to surface 108 of the previous embodiment.

FIGURE 12 shows another embodiment of the invention generally indicated at 301, with the retaining section indicated at 302 and the cutting section at 303. This embodiment differs from the previous embodiment in that a counterbore 304 is provided in forward portion 305 of section 302, and a nut 306 is disposed in counterbore 304 and engages clamping bolt 307.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a blade-like cutting tool for shaping workpieces, a retaining section of elongated shape and rectangular cross section, a portion of reduced thickness at the forward end of said retaining section, a pair of shoulders at the juncture of said reduced thickness portion and the main body of said retaining section, said shoulders being in a common plane which is inclined with respect to a plane at right angles to the longitudinal extent of said retaining section, a recess in the forward retaining section portion for receiving a cutting section, said shoulders being inclined toward said recess, the recess being open in the direction of cutting and having a first surface contiguous with said shoulders and a second surface at an acute angle to said first surface and inclined in the direction of cutting from the longitudinal axis of the retaining section, whereby a cutting section in said recess will be wedged into the recess by the cutting forces on its cutting edge, a cutting section within said recess having the same thickness as the main body of said retaining section, a slot along the edge of said cutting section facing said second recess surface, the sides of said slot engaging the sides of said reduced thickness portion to accurately locate said cutting section in a lateral direction, the bottom surface of said slot engaging said second recess surface, and another locating surface on said cutting section engageable with said first recess surface to accurately longitudinally locate said cutting section, aligned apertured portions in said cutting section and said reduced retaining section portion extending parallel to said shoulders and first recess surface, the apertured portion in said cutting section being counterbored, and a threaded bolt in said apertured portions, the head of said bolt engaging the bottom of said counterbored apertured portion and being threadably secured within said reduced section apertured portion, whereby tightening of said bolt will wedge said cutting section into firm engagement with said retaining section.

2. The combination according to claim 1, said apertured portion in said reduced retaining section portion being threaded, said bolt being threadedly engageable with said threaded apertured portion.

3. The combination according to claim 1, said apertured portion in said reduced retaining section portion being counterbored, and a nut in the counterbored part of said last-mentioned apertured portion, said bolt being threadably secured to said nut.

References Cited by the Examiner

UNITED STATES PATENTS

| | | | |
|---|---|---|---|
| 862,809 | 8/1907 | Conklin | 29—96 |
| 1,396,180 | 11/1921 | Fors | 29—96 |
| 1,409,719 | 3/1922 | Hunt | 29—96 |
| 3,124,864 | 3/1964 | Frommelt | 29—96 |
| 3,137,918 | 6/1964 | Breuning | 29—96 |

FOREIGN PATENTS

| | | |
|---|---|---|
| 3,248 | 10/1873 | Great Britain. |
| 552,382 | 4/1943 | Great Britain. |
| 1,136,185 | 11/1958 | Germany. |

WILLIAM W. DYER, JR., *Primary Examiner.*

HARRISON L. HINSON, *Examiner.*